US012801726B2

(12) United States Patent
Ndu et al.

(10) Patent No.: US 12,801,726 B2
(45) Date of Patent: Nov. 17, 2026

(54) KERNEL MONITORING BASED ON HOT ADDING A KERNEL MONITORING DEVICE

(71) Applicant: Hewlett Packard Enterprise Development LP, Spring, TX (US)

(72) Inventors: Geoffrey Ndu, Bristol (GB); Nigel John Edwards, Bristol (GB); Seosamh Donnchadh O'Riordain, Galway (IE)

(73) Assignee: Hewlett Packard Enterprise Development LP, Spring, TX (US)

( * ) Notice: Subject to any disclaimer, the term of this patent is extended or adjusted under 35 U.S.C. 154(b) by 127 days.

(21) Appl. No.: 18/673,489

(22) Filed: May 24, 2024

(65) Prior Publication Data

US 2025/0363208 A1 Nov. 27, 2025

(51) Int. Cl.
*G06F 21/54* (2013.01)
*G06F 21/55* (2013.01)

(52) U.S. Cl.
CPC ............ *G06F 21/54* (2013.01); *G06F 21/554* (2013.01)

(58) Field of Classification Search
USPC .......................................................... 726/22
See application file for complete search history.

(56) References Cited

U.S. PATENT DOCUMENTS 8,387,046 B1 * 2/2013 Montague ........... G06F 9/45558 718/1
8,719,936 B2 * 5/2014 Moffie .................. G06F 21/552 726/23
8,832,682 B2 * 9/2014 Xu ...................... G06F 9/45533 718/1
8,881,145 B2 11/2014 Chiueh et al.
9,426,147 B2 * 8/2016 Smith ................... H04L 63/083
10,033,747 B1 * 7/2018 Paithane ............... G06F 21/566
10,228,874 B2 3/2019 Wysocki et al.
10,387,180 B2 8/2019 Challa et al.
10,423,437 B2 * 9/2019 Kaplan ............... G06F 9/45558
(Continued)

FOREIGN PATENT DOCUMENTS

CN 108469984 A * 8/2018 ......... G06F 9/45558
CN 108763935 A * 11/2018 ........... G06F 21/577
(Continued)

OTHER PUBLICATIONS

Curt Hopkins, Quis custodiet ipsos custodes? HPE next-generation intrusion detection system, that's who, HP Labs, Apr. 2019 (5 pages).

(Continued)

*Primary Examiner* — Eleni A Shiferaw
*Assistant Examiner* — Duilio Munguia
(74) *Attorney, Agent, or Firm* — Trop, Pruner & Hu, P.C.

(57) ABSTRACT

In some examples, a kernel monitoring device includes a communication interface to communicate with a processing resource that executes a virtual machine (VM). The kernel monitoring device also includes a device processor to trigger a hot add of the kernel monitoring device with respect to the VM to enable communications between the kernel monitoring device and the VM. After the hot add of the kernel monitoring device with respect to the VM, the device processor receives, from the VM, information associated with a kernel of the VM, and measures the received information to determine an integrity of the kernel of the VM.

19 Claims, 4 Drawing Sheets

(56) References Cited

U.S. PATENT DOCUMENTS

| | | | | |
|---|---|---|---|---|
| 10,423,790 | B2 * | 9/2019 | Patil | G06F 21/564 |
| 10,509,758 | B1 * | 12/2019 | Habusha | G06F 13/4022 |
| 10,924,432 | B2 | 2/2021 | Johnsen et al. | |
| 11,016,798 | B2 | 5/2021 | Gopalan | |
| 11,321,251 | B2 * | 5/2022 | Suzuki | G06F 13/10 |
| 11,714,910 | B2 | 8/2023 | Ndu et al. | |
| 11,922,072 | B2 * | 3/2024 | Chang | G06F 3/0644 |
| 2012/0102252 | A1 * | 4/2012 | Tsirkin | G06F 13/4081 710/302 |
| 2017/0149807 | A1 * | 5/2017 | Schilling | G06F 21/53 |
| 2019/0042329 | A1 | 2/2019 | Kakaiya et al. | |
| 2020/0150997 | A1 | 5/2020 | Chang et al. | |
| 2020/0409740 | A1 | 12/2020 | Li et al. | |
| 2021/0006511 | A1 | 1/2021 | Uminski et al. | |
| 2021/0026948 | A1 * | 1/2021 | Ndu | G06F 21/6218 |
| 2021/0149587 | A1 | 5/2021 | Lukoshkov et al. | |
| 2023/0101885 | A1 * | 3/2023 | Apfelbaum | G06F 9/455 718/1 |
| 2024/0143376 | A1 * | 5/2024 | Poornachandran | G06F 9/45558 |

FOREIGN PATENT DOCUMENTS

| | | | | | |
|---|---|---|---|---|---|
| CN | 113568734 | A | * | 10/2021 | G06F 9/45558 |
| CN | 114237831 | A | * | 3/2022 | G06F 9/45558 |
| CN | 111638936 | B | * | 3/2023 | G06F 9/45558 |
| CN | 117112353 | A | * | 11/2023 | G06F 9/45558 |
| CN | 117806777 | B | * | 5/2024 | G06F 9/45533 |

OTHER PUBLICATIONS

Intel/Microsoft, Open Compute Project, Scalable I/O Virtualization Revision 1.0, Version 1.2, Feb. 2022 (30 pages).

Leach et al., Network Working Group, Request for Comments: 4122, A Universally Unique IDentifier (UUID) URN Namespace, Jul. 2005 (32 pages).

Libvirt Project, The virtualization API downloaded Apr. 17, 2024 (2 pages).

Nakivo, VMware vSphere Resources: HotAdd/HotPlug Explained, Jun. 1, 2023 (14 pages).

Nigel John Edwards, U.S. Appl. No. 18/170,720 entitled Kernel Information Integrity Inspection filed Feb. 17, 2023 (36 pages).

Nvidia.com, DOCA App Shield downloaded Apr. 17, 2024 (19 pages).

Red Hat, "Hardware Considerations for Implementing SR-IOV", available online at <https://access.redhal.com/documentation/en-us/red_hat_virtualization/4.0/html/hardware_ considerations for implementing_ sr-iov/index>,2023, 5 pages.

Redhat, "Red Hat Virtualization 4.0 Hardware Considerations for Implementing SR-IOV", Red Hat, Inc., 2017, 7 pages.

SRIOV, Overview of Single Root I/O Virtualization (SR-IOV), Mar. 2022 (1 page).

VMware, Hot-add and Hot-remove support for VMDirectPath I/O Devices, updated Mar. 21, 2023 (5 pages).

* cited by examiner

KERNEL MONITORING BASED ON HOT ADDING A KERNEL MONITORING DEVICE

BACKGROUND

An electronic device can include an operating system (OS) that manages resources of the electronic device. The resources include hardware resources, program resources, and other resources. The OS includes a kernel, which is the core of the OS and performs various tasks, including controlling hardware resources, arbitrating conflicts between processes relating to the resources, managing file systems, performing various services for parts of the electronic device, including other parts of the OS, and so forth.

BRIEF DESCRIPTION OF THE DRAWINGS

Some implementations of the present disclosure are described with respect to the following figures.

Figure 1:
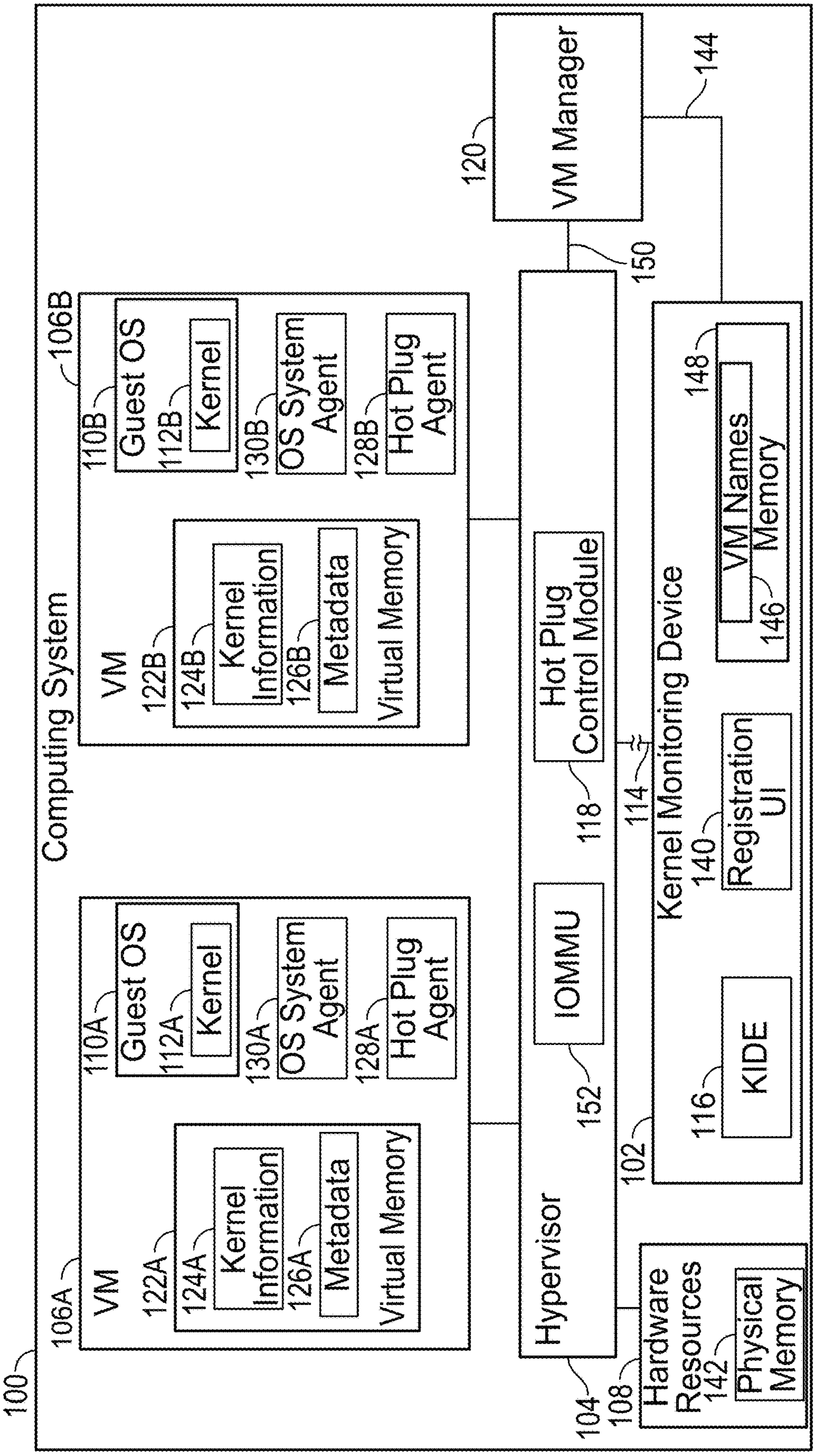
FIG. 1 is a block diagram of a computing system including a kernel monitoring device, a virtual machine (VM) manager, a hypervisor, and VMs, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A kernel of an operating system (OS) may be corrupted or compromised. For example, malware may insert malicious code into the kernel or otherwise modify the kernel. The malicious code can be in the form of a malicious kernel module, which is referred to as a rootkit. The rootkit can hide attacker activity and can have a long-term persistent presence in the OS. Alternatively, a kernel may be corrupted when errors are introduced into the kernel, such as due to malfunction of hardware or machine-readable instructions.

A computing system may include virtual computing environments, which can be in the form of virtual machines (VMs). A guest OS may execute in a VM. In some examples, a computing system may include a large quantity of VMs, such as tens of VMs, hundreds of VMs, or thousands of VMs, for example. Monitoring the integrity of kernels of guest OSes in VMs of a computing system may be challenging. In some examples, to monitor the integrity of kernels in multiple VMs, a kernel monitoring device can implement input/output (I/O) virtualization to create virtualized instances of the kernel monitoring device that are able to monitor the integrity of the kernels in respective VMs. In some examples, I/O virtualization includes Single Root Input/Output (I/O) Virtualization (SR-IOV), which provides a hardware-assisted I/O virtualization technique for partitioning an I/O device, such as a kernel monitoring device, into virtualized instances of the kernel monitoring device. For example, the virtualized instances of the kernel monitoring device may be in the form of virtual functions (VFs), which can be used to perform integrity monitoring of respective VMs in a computing system. If there are at least as many VFs as VMs, then the VFs can separately connect to the VMs to perform kernel monitoring. Another example of I/O virtualization is Scalable I/O Virtualization (SIOV), which also provides for hardware-assisted I/O virtualization.

Implementing a large quantity of VFs in a hardware device, such as a kernel monitoring device, can be expensive. To support a large quantity of VFs, the kernel monitoring device would have to be configured with a processing resource of sufficient capacity, which can lead to an increased cost of the kernel monitoring device. Further, some hardware devices used to perform kernel monitoring may not have an I/O virtualization capability (e.g., SR-IOV or SIOV capability) due to the increased cost associated with implementing I/O virtualization.

In accordance with some implementations of the present disclosure, a kernel monitoring device is able to selectively connect to any VM of a plurality of VMs executed in a computing system, by hot plugging the kernel monitoring device to the VM. If the kernel monitoring device was not previously connected to the VM, then hot plugging can refer to the kernel monitoring device being hot added with respect to the VM, which refers to establishing a connection between the kernel monitoring device and the VM while the VM is actively running. In some examples, the kernel monitoring device does not implement I/O virtualization. In other examples, the kernel monitoring device implements I/O virtualization to create virtual functions (VFs). However, the quantity of VFs provided by the kernel monitoring device may be less than the quantity of VMs in the computing system. A device controller of the kernel monitoring device can trigger a hot add of the kernel monitoring device with respect to the VM. Hot adding the kernel monitoring device can refer to either (1) hot adding the physical kernel monitoring device with respect to the VM to enable communication between the physical kernel monitoring device and the VM, or (2) hot adding a VF of the kernel monitoring device with respect to the VM to enable communication between the VF and the VM. After the hot add of the kernel monitoring device with respect to the VM, the kernel monitoring device receives, from the VM, kernel information associated with a kernel of the VM, and measures the received kernel information to determine an integrity of the kernel of the VM.

Kernel information associated with a kernel that is to be measured can include any or some combination of the following: program code of the kernel (e.g., the entirety of the kernel or a portion of the kernel), kernel modules, configuration information of the kernel, and/or other information associated with the kernel. A "kernel module" refers to a piece of program code that can be loaded to or unloaded from a kernel, in this case the kernel of a guest OS in a VM.

FIG. 1 is a block diagram of example computing system 100 that includes a kernel monitoring device 102 according to some implementations of the present disclosure. Examples of computing systems can include any or some combination of the following: a computer (e.g., a server computer, a desktop computer, a notebook computer, a tablet computer, etc.), a smartphone, a vehicle, a communication node, a storage system, a household appliance, or any other type of electronic device. Note that a computing system can include a collection of electronic devices, which can include a single electronic device or multiple electronic devices.

The kernel monitoring device 102 can be implemented using a management controller of the computing system 100. For example, the management controller can be a baseboard management controller (BMC), which is separate from a host central processing unit (CPU) of the computing system 100. In other examples, the kernel monitoring device 102 can be implemented using another type of controller that is separate from the host CPU, where such other type of controller can include a microcontroller, a microprocessor, a programmable integrated circuit, or a programmable gate array separate from the host CPU.

The computing system 100 includes a hypervisor 104 (also referred to as a virtual machine monitor). The hypervisor 104 is responsible for creating and managing execution of VMs in the computing system 100. In the example of FIG. 1, two VMs 106A and 106B are depicted. In other examples, just a single VM can execute in the computing system 100, or more than two VMs can execute in the computing system 100.

The hypervisor 104 can present virtualized instances of hardware resources 108 of the computing system 100 to each of the VMs 106A and 106B. Examples of hardware resources 108 can include any or some combination of the following: a processing resource (e.g., including a host CPU), a storage resource (e.g., including one or more storage devices), a memory resource (e.g., including one or more memory devices), a communication resource (e.g., including one or more network interfaces), and/or other types of hardware resources.

A host CPU can include one or more processors. A processor can include a microprocessor, a core of a multi-core microprocessor, a microcontroller, a programmable integrated circuit, a programmable gate array, or another hardware processing circuit. A storage device can include a disk-based storage device or a solid-state drive. A network interface includes a communication transceiver to transmit and receive signals over a network, and one or more protocol layers that manage the communication of data according to one or more communication protocols. The host CPU can execute primary machine-readable instructions of the computing system 100, such as a host OS (if present), system firmware (such as Basic Input/Output System (BIOS) code or Universal Extensible Firmware Interface (UEFI) code), an application program, or other primary machine-readable instructions.

A memory device can include a dynamic random access memory (DRAM) device, a static random access memory (SRAM) device, a flash memory device, or another type of memory device. FIG. 1 shows a physical memory 142 that is part of the hardware resources 108 of the computing system 100. The physical memory 142 includes one or more memory devices.

Each VM includes a guest OS. For example, the VM 106A includes a guest OS 110A, and the VM 106B includes a guest OS 110B. A guest OS includes a kernel as well as other parts of the OS. In the example of FIG. 1, the guest OS 110A includes a kernel 112A, and the guest OS 110B includes a kernel 112B.

The "kernel" of an OS includes a portion of the OS that controls resources of a computing device (physical computing device or virtual computing device). The kernel can also manage conflicts or contention between processes of the computing device. The kernel of the OS is separate from other parts of the OS, such as device drivers, libraries, and utilities. In other examples, device drivers may be part of a kernel.

The kernel monitoring device 102 is connected to a communication link in the computing system 100. In some examples, the computing link includes an interconnect 114. Examples of interconnects can include any or some combination of the following: a Peripheral Component Interconnect Express (PCIe) interconnect, a Compute Express Link (CXL) interconnect, or another type of interconnect that supports hot plugging of a device to a VM. If a PCIe interconnect is used, then a device connected to the PCIe interconnect is referred to as a PCIe device.

The kernel monitoring device 102 is able to communicate, over the interconnect 114, with a processing resource (in the computing system 100) that executes the hypervisor 104. The processing resource (e.g., the host CPU of the computing system 100) can be connected directly to the interconnect 114, or alternatively, can be coupled to the interconnect 114 through one or more intermediary devices. Note that the VMs 106A and 106B are also executed by the processing resource (e.g., the host CPU) of the computing system 100.

The kernel monitoring device 102 includes a kernel integrity determination engine (KIDE) 116. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to machine-readable instructions (software and/or firmware) executable on one or more hardware processing circuits.

The KIDE 116 is used to determine the integrity of kernels in respective VMs. In accordance with some examples of the present disclosure, the kernel monitoring device 102 is selectively connected to any of multiple VMs in the computing system 100. The connection between the kernel monitoring device 102 is a temporary or intermittent connection based on hot plugging. For example, the kernel monitoring device 102 can be connected to a first VM at a first time (by hot adding the kernel monitoring device 102 with respect to the first VM), then disconnected from the first VM (by hot removing the kernel monitoring device 102 from the first VM), and then connected to a second VM at a second time different from the first time (by hot adding the kernel monitoring device 102 with respect to the second VM).

Connecting a kernel monitoring device 102 based on hot plugging of the kernel monitoring device 102 with respect to a VM can refer to either connecting the physical kernel monitoring device 102 to the VM, or alternatively, to connecting a virtual element in the kernel monitoring device 102 to the VM. The virtual element can include a VF in some examples.

In some examples, the kernel monitoring device 102 can implement I/O virtualization, such as SR-IOV (Single Root I/O Virtualization), SIOV (Scalable I/O Virtualization), and so forth. In such examples, the KIDE 116 can include one or more VFs (referred to as "kernel integrity determination VFs"). In examples where there are multiple kernel integrity determination VFs in the kernel monitoring device 102), the quantity of such VFs can be less than the quantity of the VMs in the computing system 100.

In examples where SR-IOV is implemented, the kernel monitoring device 102 includes a PCIe physical function (PF), which is the primary function of the kernel monitoring device 102 and which can advertise the kernel monitoring device's 102 SR-IOV capabilities. Additionally, one or more PCIe VFs can be associated with the PF. The VFs share physical resources of the kernel monitoring device 102. In accordance with some implementations of the present disclosure, the VFs are virtualized instances of the kernel monitoring device 102. A kernel integrity determination VF is able to selectively (and intermittently) connect to respective VMs using hot-plug capabilities.

More specifically, each kernel integrity determination VF can establish a communication channel with a VM. The communication channel that is established is a virtual channel between virtual entities, which include the kernel integrity determination VF and a VM. For enhanced security, data communicated over the communication channel between each kernel integrity determination VF and a VM can be encrypted to prevent another entity from accessing the communicated data.

In other examples, SIOV can be used instead of SR-IOV. SIOV also provides hardware-assisted I/O virtualization. SIOV is defined by specifications from the Open Compute Project (OCP).

The hypervisor 104 can also support SR-IOV or SIOV to allow virtualized instances of the kernel monitoring device 102 to directly interact with VMs (e.g., by bypassing the hypervisor 104). Although reference is made to SR-IOV and SIOV as examples of I/O virtualization that can be performed by the kernel monitoring device 102, other types of I/O virtualization can be employed in other examples to allow the kernel monitoring device 102 to appear as multiple devices to corresponding VMs. Generally, I/O virtualization performed by the kernel monitoring device 102 bypasses the hypervisor 104 such that a virtualized instance of the kernel monitoring device 102 can interact with a VM to obtain kernel information associated with the VM without being intercepted by the hypervisor 104.

In alternative examples, I/O virtualization is not implemented by the kernel monitoring device 102. In such examples, the physical kernel monitoring device 102 is selectively connected to a VM such that a communication channel is established between the kernel monitoring device 102 (and more specifically, the KIDE or kernel integrity determination engine 116) and the VM. The KIDE 116 is able to obtain kernel information of a VM when the KIDE 116 is connected to the VM.

The hypervisor 104 includes a hot plug control module 118 to support hot plugging of the kernel monitoring device 102 to a VM (e.g., 106A or 106B). The hot plug control module 118 can be implemented using machine-readable instructions. Hot plugging can refer to hot adding or hot removing. Hot adding the kernel monitoring device 102 with respect to a VM can refer to establishing a connection between the kernel monitoring device 102 and the VM (that was previously disconnected from the kernel monitoring device 102) while the VM is actively running in the computing system 100.

Hot removing the kernel monitoring device 102 from a VM refers to tearing down the connection between the kernel monitoring device 102 and the VM, while the VM is actively running in the computing system 100. Hot adding and hot removing of the kernel monitoring device 102 with respect to a VM is managed by the hot plug control module 118.

Additionally, the kernel monitoring device 102 can present a registration user interface (UI) 140 that accessible by a system administrator or another user to register VMs that are to be monitored on the computing system 100. In more specific examples, the registration UI 140 may be provided by the KIDE 116. The registration UI 140 can be accessed using any of the following protocols: REpresentational State Transfer (REST) protocol, Simple Network Management Protocol (SNMP), gRemote Procedure Call (gRPC) protocol, or any other type of protocol that supports communications between entities. The administrator or other user may access the registration UI 140 using a remote user device (not shown), such as a computer or other electronic device.

Identities of VMs to be monitored are input into the registration UI 140. In some examples, the identities of the VMs can include names of the VMs. The names can include alphanumeric characters. The kernel monitoring device 102 stores the VM names 146 in a memory 148 of the kernel monitoring device 102. Names of VMs are unique within a single host, such as the computing system 100. However, names of VMs may be reused in different hosts, so that it may be possible for a VM in a first host (e.g., the computing system 100) to share the same name with a VM in another host. In addition, VM names can be recycled on a host. For example, an administrator can rename an Ubuntu VM named "admin-vm" to "user-vm2" and create a new Windows-based "admin-vm." So even within a host sometimes there may be ambiguity in which VM a VM name identifies.

The kernel monitoring device 102 can obtain globally unique identifiers of the VMs from a VM manager 120. In some examples, the VM manager 120 includes a set of tools for managing a virtualized platform. For example, the VM manager 120 can include an application programming interface (API) and a management tool. An example of the VM manager 120 is the libvirt toolkit. In other examples, the VM manager 120 can be implemented using oVirt, the WINDOWS Admin Center, VMWare vSphere, or any other type of tool (or set of tools) that allows for interaction with a virtualized platform (e.g., the virtualized platform that includes the hypervisor 104 and the VMs 106A and 106B).

The VM manager 120 can generate globally unique identifiers of the VMs, which are unique across multiple hosts, as the VMs are created by the hypervisor 104. In some examples, the globally unique identifiers of the VMs include Universally Unique Identifiers (UUIDs), which may have a format according to Request for Comments (RFC) 4122, entitled "A Universally Unique Identifier (UUID) URN Namespace," dated July 2005.

In some examples, the KIDE 116 in the kernel monitoring device 102 accesses the VM manager 120 over a communication link 144 to obtain a UUID for a given VM name 146 of a VM that is to be monitored. In some examples, the communication link 144 can include an API of the VM manager 120. In a more specific example, the API includes a REST API. In other examples, other types of communication links can be employed, such as a computer bus, an inter-process link, and so forth.

In further examples, during registration of VMs for kernel monitoring, the kernel monitoring device 102 can receive, through the registration UI 140, UUIDs or other globally unique identifiers of the VMs. In such examples, the kernel monitoring device 102 can store the UUIDs of VMs subject to kernel monitoring in the memory 148 of the kernel monitoring device 102.

The registration UI 140 of the kernel monitoring device 102 allows for the addition and removal of VMs subject to kernel monitoring at any time. Also, a VM does not have to be actively running in the computing system 100 to be registered for kernel monitoring. For example, the hypervisor 104 may have created a given VM, but the given VM may be in a dormant state (e.g., a sleep or hibernation state). The registration UI 140 may be used to register such a dormant VM for kernel monitoring. To determine whether a VM is actively running, the kernel monitoring device 102 can contact the VM manager 120. In response to a request from the kernel monitoring device 102 seeking a status of a particular VM, the VM manager 120 can contact the hypervisor 104 over a communication link 150 to obtain the status (e.g., actively running, dormant, etc.) of the particular VM. In other examples, the kernel monitoring device 102 can contact the hypervisor 104 to obtain the status of a VM.

Alternatively, the kernel monitoring device 102 can subscribe (either to the VM manager 120 or the hypervisor 104) for notification of certain events, including events associated with VMs transitioning from a dormant state to an actively running state. When an event indicating that a particular VM has transitioned from a dormant state to an actively running state occurs, the VM manager 120 or the hypervisor 104 may notify the kernel monitoring device 102 of the event.

In examples according to FIG. 1, a VM in the computing system 100 may include an OS system agent that is able to interact with the KIDE 116 of the kernel monitoring device 102. For example, the VM 106A includes an OS system agent 130A, and the VM 106A includes an OS system agent 130B. An OS system agent is implemented using machine-readable instructions executed in the respective VM. In some examples, the OS system agent may be implemented as a kernel module that is part of the kernel of the guest OS in the respective VM. One of the tasks of the OS system agent is to provide metadata to the kernel monitoring device 102 when the respective VM is selected for kernel monitoring by the kernel monitoring device 102. For example, if the VM 106A is selected for kernel monitoring, the OS system agent 130A can send metadata 126A to the kernel monitoring device 102. If the VM 106B is selected for kernel monitoring, the OS system agent 130B can send metadata 126B to the kernel monitoring device 102.

In examples where the kernel monitoring device 102 is a PCIe device, the OS system agent can be part of a driver for the PCIe device. In more specific examples, if the kernel monitoring device 102 supports SR-IOV, then the OS system agent is part of a driver that manages the PCIe PF (physical function) of the kernel monitoring device 102. In examples where one or more kernel integrity determination VFs are used, an OS system agent can be part of a driver that manages a VF. In examples where SR-IOV is not supported, the OS system agent may be part of a driver for a PCIe function.

The VM 106A stores the metadata 126A in a virtual memory 122A in the VM 106A, and the VM 106B stores the metadata 126B in a virtual memory 122B in the VM 106B. A virtual memory of a VM refers to a virtualized instance of the physical memory 142 that is part of the hardware resources 108 in the computing system 100. The data in the virtual memory physically resides in the physical memory 142.

Additionally, in some examples, an administrator or another user may supply additional metadata through the registration UI 140. The additional metadata may be in addition to the metadata provided by an OS system agent. In other examples, an administrator or another user does not supply additional metadata.

In specific examples, the metadata (from an OS system agent and/or an administrator or another user) may include a list of names of authorized kernel modules in a VM, a memory map, and/or other information. A kernel module refers to a piece of program code that can be loaded to or unloaded from a kernel, in this case the kernel of a guest OS in a VM. The names of authorized kernel modules indicate what kernel modules are expected to be present in the VM. Any kernel module present in the VM that is not included in the list of names of authorized kernel modules is deemed to be unauthorized.

In some examples, the memory map can include physical addresses and extents of memory regions of the physical memory 142 that are to be monitored by the kernel monitoring device 102. These memory regions contain kernel information that is to be monitored by the kernel monitoring device 102. FIG. 1 shows kernel information 124A in the virtual memory 122A in the VM 106A, and kernel information 124B in the virtual memory 122B in the VM 106B. The kernel information 124A is physically stored in one or more first memory regions of the physical memory 142, and the kernel information 124B is physically stored in one or more second memory regions of the physical memory 142. The memory map identifies the first and second memory regions for the kernel information 124A and 124B.

In further examples, the metadata may also include a reference measurement of kernel information for a kernel in a VM. A reference measurement can refer to an initial measurement of kernel information when the VM was created and started. A "measurement" of kernel information can refer to applying a function (e.g., a cryptographic hash function) on the kernel information, which results in the function producing a measurement value (e.g., a hash value). The reference measurement includes a measurement value (or multiple measurement values) based on the initial kernel information. Note that the reference measurement may also include an updated measurement performed when the kernel information of the kernel is updated, such as when a new kernel module is added or when an existing kernel module is updated.

In other examples, the kernel monitoring device 102 may not be associated with an OS system agent in a VM. In such latter examples, the OS system agent 130A is omitted from the VM 106A, and the OS system agent 130B is omitted from the VM 106B. In this case, an administrator or another user can use a tool executed in a remote electronic device to provide metadata relating to kernel information to be monitored to the kernel monitoring device 102. For example, when the administrator or other user is registering VMs for kernel monitoring, the administrator or other user can also supply the metadata to the kernel monitoring device 102, which can be stored in the memory 148 of the kernel monitoring device 102.

Each VM further includes a hot plug agent to detect hot plugging of devices (whether physical devices or virtual devices). The VM 106A includes a hot plug agent 128A, and the VM 106B includes a hot plug agent 128B. A hot plug agent can be implemented as machine-readable instructions in a VM. The hot plug agent may be part of the guest OS in the VM, or may be external to the guest OS in the VM.

Figure 2:
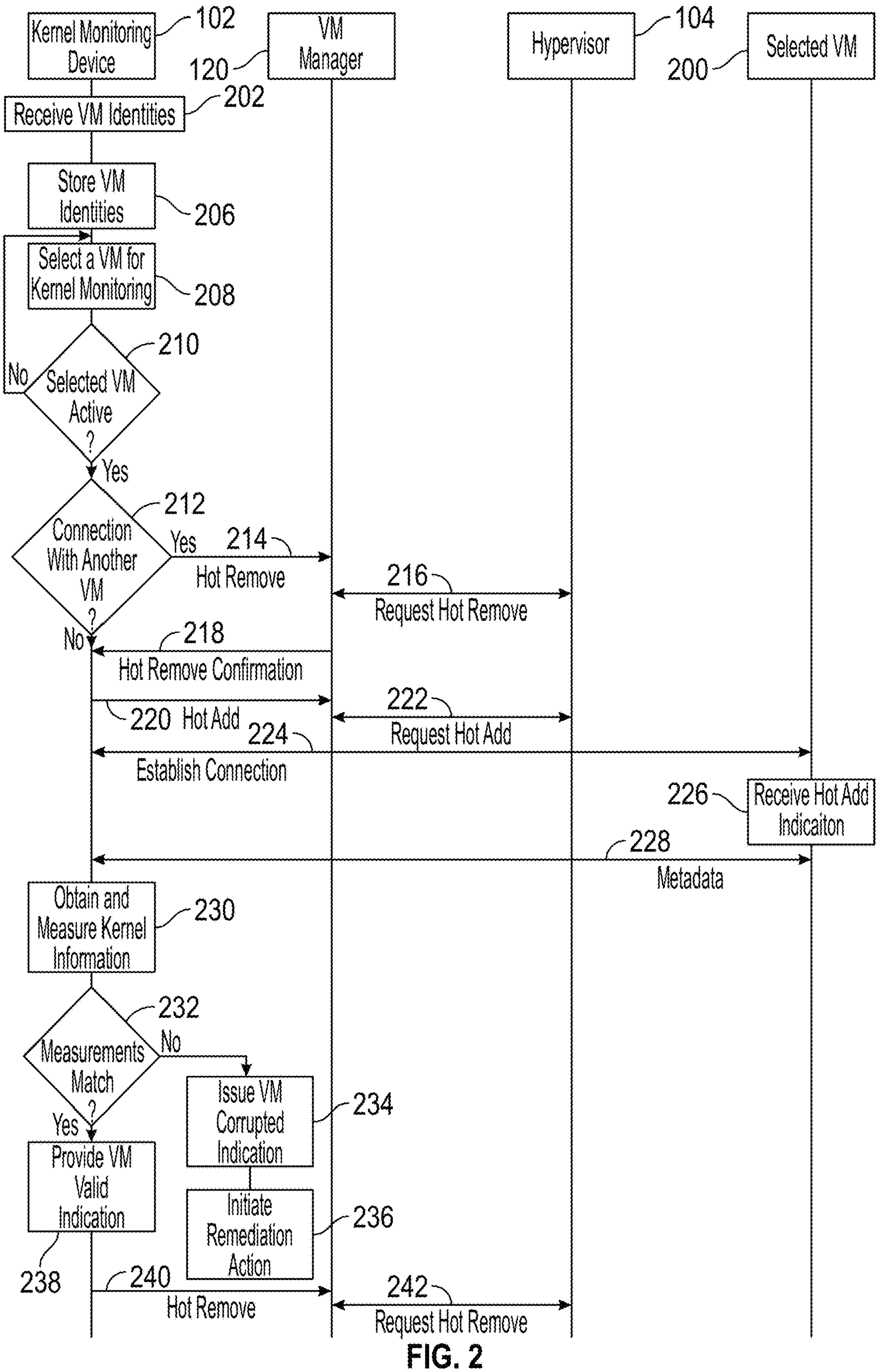
FIG. 2 is a flow diagram of a process for monitoring the integrity of kernels in VMs, according to some examples.

The following discussion refers to both FIG. 1 and FIG. 2. FIG. 2 is a flow diagram of a process relating to kernel integrity monitoring, in accordance with some examples of the present disclosure. Although FIG. 2 shows a specific order of tasks, it is noted that in other examples, the tasks can be performed in a different order, some of the tasks may be omitted, and other tasks added.

The kernel monitoring device 102 receives (at 202), through the registration UI 140, identities (e.g., VM names or UUIDs) of VMs subject to kernel monitoring. The identities may be received from a remote electronic device associated with an administrator or another user, for example. The kernel monitoring device 102 stores (at 206) the identities (e.g., the VM names 146) in the memory 148.

The KIDE 116 in the kernel monitoring device 102 can select (at 208) a VM 200 (e.g., either the VM 106A or 106B) for kernel monitoring. The selection is from among the VMs identified by UUIDs corresponding to the VM names 146 stored in the kernel monitoring device 102, for example. In some examples, the kernel monitoring device 102 can obtain a UUID corresponding to a VM name from the VM manager 120. In other examples, the kernel monitoring device 102 received UUIDs of VMs during registration The selection of the VM 200 (hereinafter referred to as the "selected VM") can be according to any of various criteria, including a round robin scheduling criterion (in which successive VMs are selected in an order), a priority scheduling criterion (in which priorities are assigned to the VMs and a higher priority VM is selected over a lower priority VM for kernel monitoring), a random criterion (in which a VM is selected randomly from multiple VMs), a priority-based round robin scheduling criterion (which uses round robin to select from VMs, except that a VM having a priority of greater than a priority threshold can skip the queue and be selected), or any other selection criterion.

In other examples, instead of or in addition to the KIDE 116 selecting a VM to monitor, the KIDE 116 may receive, from another entity (either in the kernel monitoring device 102 or outside the kernel monitoring device 102) a request that identifies a selected VM to monitor.

The KIDE 116 checks (at 210) whether the selected VM 200 is actively running with the VM manager 120. For example, the KIDE 116 can receive status information of the selected VM 200 from the VM manager 120 or from the hypervisor 104. If the KIDE 116 determines that the selected VM 200 is not actively running, the KIDE 116 selects (at 208) the next VM according to a selection criterion.

Once an actively running selected VM (e.g., 200) is detected, the KIDE 116 checks (at 212) whether a connection exists between the kernel monitoring device 102 and another VM (different from the selected VM 200). Note that this existing connection can be between the other VM and the physical kernel monitoring device 102 or a kernel integrity determination VF. If so, the KIDE 116 sends (at 214) a hot remove request to the VM manager 120 to hot remove the kernel monitoring device 102 from the other VM. The hot remove request can be issued over the communication link 144, e.g., an API of the VM manager 120. If the communication link 144 is an API, then the hot remove request includes a call of a routine in the API to request the hot remove.

In response to the hot remove request, the VM manager 120 requests (at 216) the hot plug control module 118 in the hypervisor 104 to hot remove the kernel monitoring device 102 from the other VM. Alternatively, the KIDE 116 can send a request to the hot plug control module 118 in the hypervisor 104 to hot remove the kernel monitoring device 102 from the other VM. Hot removing the kernel monitoring device 102 from the other VM can refer to hot removing the physical kernel monitoring device 102 from the other VM, or hot removing a kernel integrity determination VF in the kernel monitoring device 102 from the other VM.

In response to receiving (at 218) a confirmation that the kernel monitoring device 102 has been hot removed from the other VM, the KIDE 116 sends (at 220), over the communication link 144, a hot add request to the VM manager 120 to hot add the kernel monitoring device 102 with respect to the selected VM 200. If the communication link 144 is an API, then the hot add request includes a call of a routine in the API to request the hot add.

Hot adding the kernel monitoring device 102 with respect to the selected VM 200 can refer to hot adding the physical kernel monitoring device 102 with respect to the selected VM 200, or hot adding a kernel integrity determination VF in the kernel monitoring device 102 with respect to the selected VM 200.

In some examples, the hot add request can specify that the kernel monitoring device 102 is to be added as "pass through" to the selected VM 200. The pass through feature, such as a PCIe pass through feature, enables the kernel monitoring device 102 to be assigned directly to the selected VM 200. This allows the kernel monitoring device 102 to use direct memory access (DMA) to obtain the kernel information from the virtual memory of the selected VM. In some examples, the hypervisor 104 can enable DMA access of a VM's virtual memory by setting up an I/O memory management unit (IOMMU) 152 (FIG. 1) when the hypervisor 104 initializes the guest OS in the selected VM. IOMMU is a technology that connects a DMA-capable I/O interconnect to system memory, which in this case is the physical memory of the selected VM.

In response to the hot add request, the VM manager 120 requests (at 222) the hot plug control module 118 in the hypervisor 104 to hot add the kernel monitoring device 102 with respect to the selected VM. Alternatively, the KIDE 116 can send a request to the hot plug control module 118 in the hypervisor 104 to hot add the kernel monitoring device 102 with respect to the selected VM.

Once the kernel monitoring device 102 has been hot added by the hypervisor 104 with respect to the selected VM, a connection is established (at 224) between the kernel monitoring device 102 and the selected VM 200. This connection can be a pass-through connection that allows direct interaction between the selected VM 200 and the KIDE 116 in the kernel monitoring device 102. The connection includes a communication channel between the kernel monitoring device 102 (or a kernel integrity determination VF) and the selected VM 200.

In examples where OS system agents are implemented in VMs, the OS system agent (e.g., 130A or 130B in FIG. 1) in the selected VM 200 receives (at 226) an indication (a message, a signal, an information element, a call, or any other indicator) of the hot adding of the kernel monitoring device 102 with respect to the selected VM. For example, the hot plug agent (e.g., 128A or 128B in FIG. 1) in the selected VM detects the hot add of the kernel monitoring device 102 with respect to the selected VM, and in response, the hot plug agent notifies the respective OS system agent (e.g., 130A or 130B in FIG. 1) of the hot add event that hot adds the kernel monitoring device 102 with respect to the selected VM. This notification provides an indication that the kernel monitoring device 102 is connected and ready to be used. In some examples, the OS system agent in the selected VM may have subscribed with the hot plug agent for hot plug events. A hot plug event is generated when a particular device is hot added or removed. The notification of a hot plug event may include an API function call in some examples.

In other examples, if the OS system agent in the selected VM is a kernel module, the OS system agent may be notified of a hot plug event by the kernel (e.g., 112A or 112B in FIG. 1) in the selected VM. In such latter examples, the hot plug agent in a VM may be omitted.

In further examples, if the OS system agent in the selected VM is part of a driver for the kernel monitoring device 102 (e.g., a driver for a PCIe PF or VF if SR-IOV is supported or a driver for a PCIe function if SR-IOV is not supported)

of the kernel monitoring device 102), then the kernel in the selected VM can automatically load the OS system agent when the kernel monitoring device 102 is hot added. Also, the OS system agent can be removed when the kernel monitoring device 102 is hot removed.

The OS system agent retrieves the metadata (e.g., 126A or 126B in FIG. 1) associated with the kernel information (e.g., 124A or 124B) to be measured, and sends (at 228) the metadata to the KIDE 116. The metadata may include a list of names of authorized kernel modules in a VM, a memory map, a reference measurement of kernel information, and/or other information. The reference measurement can be produced by the OS system agent in the selected VM and stored as part of the metadata.

In examples where OS system agents are not implemented in VMs, then the metadata would be provided by a different entity (e.g., a user or another entity), instead of the OS system agent of the selected VM 200, to the kernel monitoring device 102.

Based on the received metadata received, the KIDE 116 obtains (at 230) the kernel information (e.g., 124A or 124B in FIG. 1) of the kernel (e.g., 112A or 112B in FIG. 1) in the selected VM 200 and measures (at 230) the obtained kernel information. For example, the KIDE 116 can use the memory map in the metadata to identify the memory region(s) of the physical memory 142 where the kernel information is stored, and retrieve the kernel information from the memory region(s). The measurement of the obtained kernel information generates a measurement value based on the kernel information retrieved from the memory region(s). The KIDE 116 determines (at 232) whether the generated measurement value matches the reference measurement value in the metadata. Note that there may be multiple generated measurement values compared to respective reference measurement values. If the KIDE 116 determines that the generated measurement value does not match the reference measurement value, then that indicates the kernel in the selected VM may have been corrupted, and the KIDE 116 issues (at 234) a VM corrupted indication, which can include a message, a signal, or any other indicator. In response to the VM corrupted indication, the kernel monitoring device 102 (or another entity such as the hypervisor 104 or a different entity) can initiate (at 236) a remediation action. For example, the remediation action can include pausing or stopping the corrupted VM, or alternatively, removing the corrupted VM from the computing system 100 by tearing down the corrupted VM. A command to pause, stop, or remove the selected VM can include a UUID of the selected VM.

If the KIDE 116 determines (at 232) that the generated measurement value matches the reference measurement value, then that indicates the kernel in the selected VM has not been corrupted, and the KIDE 116 can provide (at 238) a VM valid indication. The VM valid indication can include the KIDE 116 not issuing any indication that the selected VM is corrupted or otherwise faulty (e.g., an absence of the VM corrupted indication constitutes a VM valid indication). Alternatively, the VM valid indication can include a message, an information element, or another indicator specifying that the selected VM is functioning correctly.

Next, the KIDE 116 can send (at 240) a hot remove request to the VM manager 120 to hot remove the kernel monitoring device 102 from the selected VM. In response to the hot remove request, the VM manager 120 requests (at 242) the hot plug control module 118 in the hypervisor 104 to hot remove the kernel monitoring device 102 from the selected VM 200. Alternatively, the KIDE 116 can send a request to the hot plug control module 118 in the hypervisor 104 to hot remove the kernel monitoring device 102 from the selected VM 200.

The KIDE 116 can continue with tasks 208-242 for any remaining VMs to perform kernel monitoring of the remaining VMs. After all VMs to be monitored have been checked, the KIDE 116 can re-iterate the kernel monitoring of the VMs.

Although the foregoing examples assume that the metadata received from the OS system agent of the selected VM includes a reference measurement, it is noted that in alternative examples, the metadata from the OS system agent does not include a reference measurement. In such alternative examples, when the KIDE 116 measures kernel information of the selected VM, the KIDE 116 can determine whether the measurement is a first measurement after an initial start (after creation) of the selected VM. If so, the KIDE 116 can store this first measurement as a reference measurement, which is to be compared with subsequent measurements of the kernel information of the kernel in the selected VM.

In some examples, the KIDE 116 can also use lifecycle state information of the selected VM as part of the determination of whether the selected VM has been corrupted. For example, the KIDE 116 can use the selected VM's UUID to query the VM manager 120 for the lifecycle state information of the selected VM. In turn, the VM manager 120 can obtain the lifecycle state information from the hypervisor 104, and return the lifecycle state information to the KIDE 116. "Lifecycle state information" can include information of a state of a VM, where the state can include a dormant state or an actively running state. The lifecycle state information can indicate whether the selected VM is running and started up normally (i.e., the selected VM arrived at the actively running state directly from a boot or a re-boot).

The lifecycle state information can also include time information indicating how long (a time length) a VM has been in the actively running state. The lifecycle state information of the VM can be used by the KIDE 116 to determine whether the KIDE 116 is to treat a current measurement of kernel information as a reference measurement. For example, if the lifecycle state information indicates that the selected VM has just started running and the selected VM arrived at the active running state from a boot (or re-boot), then the current measurement of kernel information is to be treated as a reference measurement. The KIDE 116 can also use the lifecycle state information to determine whether tampering has occurred with the OS system agent in the selected VM. For example, an attacker may reset the OS system agent in an attempt to trick the kernel monitoring device 102 into accepting a measurement of kernel information of a corrupted kernel as a reference measurement. Resetting the OS system agent can reset the time information in the lifecycle state information to an initial time value. The KIDE 116 can store previously received lifecycle state information from the selected VM. If the KIDE 116 detects that the time information of a current lifecycle state information indicates a running time of the selected VM that is less than a running time indicated in a previously stored lifecycle state information for the selected VM, then that would indicate that the VM has been tampered with. If the KIDE 116 detects that the running time of the selected VM has gone backwards (i.e., the running time of the selected VM indicated by the time information of the current lifecycle state information is less than the running time indicated in the previously stored lifecycle state information for the selected VM), the KIDE 116 would issue a VM corrupted indication to indicate that the selected VM is potentially corrupted. This check of the lifecycle state information as part of validating the selected VM prevents the reset attack that can trick the KIDE 116 in accepting a measurement of a corrupted kernel as a reference measurement.

In some examples where the VM manager 120 is a libvirt toolkit, the KIDE 116 can use libvirt's lifecycle API to get the selected VM's virDomainRunningReason, which is an example of the lifecycle state information.

In further examples, the KIDE 116 can detect other types of attacks, such as tampering of a memory map referring to storage locations of kernel information. For example, an attacker (a human or malware) may modify a memory map so that the memory map refers to kernel information of a dormant original kernel instead of an active malicious kernel. The kernel information of the malicious kernel may reside in different memory region(s) than the memory region(s) storing the kernel information of the original kernel. To detect tampering of metadata (including a memory map) for a kernel, the kernel monitoring device 102 can store prior metadata, and can check current metadata received from the OS system agent with the prior metadata to determine whether metadata tampering has occurred. In some examples, the kernel monitoring device 102 can store a hash value (or other value) of the metadata, and the comparison by the KIDE 116 can be of the hash value of the current metadata with the hash value of the prior metadata. If the hash values do not match, then metadata tampering is indicated, and the KIDE 116 can issue a VM corrupted indication indicating that the selected VM is potentially corrupted.

By being able to selectively connect a kernel monitoring device (or VFs in the kernel monitoring device) to VMs using hot plugging, kernels of multiple VMs can be monitored in a cost-effective manner using the kernel monitoring device. For example, a kernel monitoring device that does not implement I/O virtualization (and thus does not provide VFs) can be used to selectively hot plug to different VMs at different times to perform kernel monitoring. As another example, a smaller quantity of VFs in a kernel monitoring device that implements I/O virtualization can be used to monitor the kernels of a larger quantity of VMs.

Figure 3:
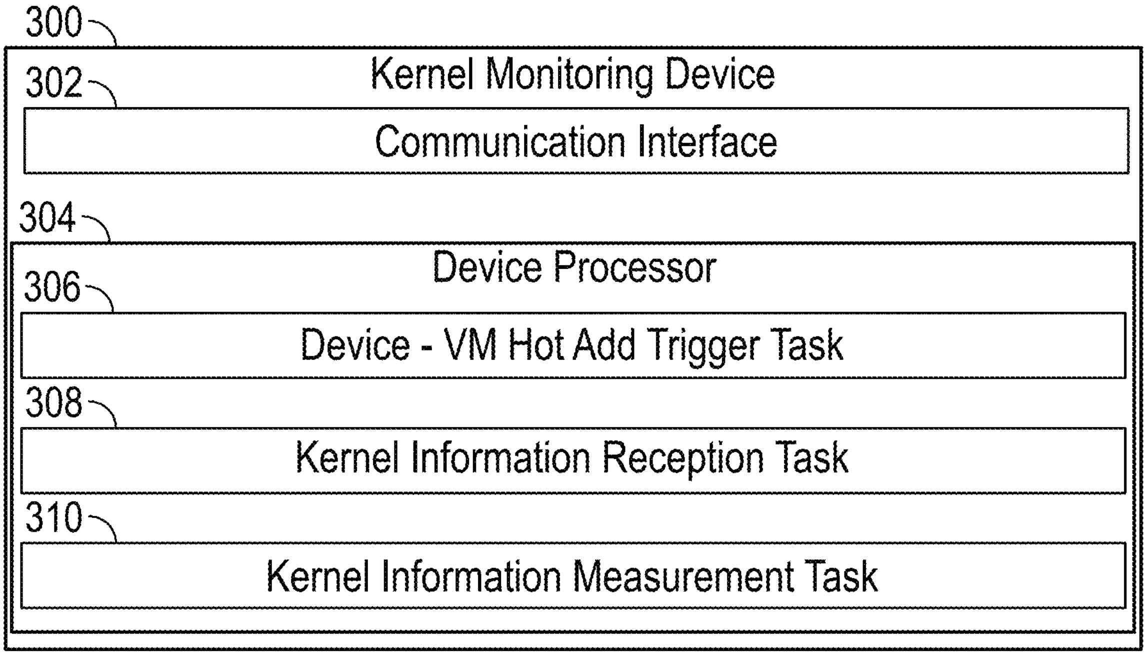
FIG. 3 is a block diagram of a kernel monitoring device according to some examples.

FIG. 3 is a block diagram of a kernel monitoring device 300 according to some examples of the present disclosure. The kernel monitoring device 300 is an example of the kernel monitoring device 102 of FIG. 1.

The kernel monitoring device 300 includes a communication interface 302 to communicate with a processing resource (including the host CPU) of a computing system that executes a VM, such as the VM 106A or 106B of FIG. 1. The communication interface 302 can be an interconnect interface to communicate over an interconnect such as a PCIe interconnect, a CXL interconnect, or another type of interconnect.

The kernel monitoring device 300 includes a device processor 304 to perform various tasks. Note that the device processor 304 of the kernel monitoring device 300 is separate from the host CPU of a computing system in which the kernel monitoring device 300 is located.

The tasks of the device processor 304 include a device-VM hot add trigger task 306 to trigger a hot add of the kernel monitoring device 300 with respect to the VM to enable communications between the kernel monitoring device and the VM. The hot adding can be performed by a hypervisor, such as by the hot plug control module 118 in the hypervisor 104 of FIG. 1. In some examples, the device processor 304 can trigger the hot add by sending a hot add request, such as to a VM manager (e.g., 120 in FIG. 1) or to the hypervisor.

The tasks of the device processor 304 include a kernel information reception task 308 to, after the hot add of the kernel monitoring device 300 with respect to the VM, receive, from the VM, kernel information associated with a kernel of the VM. For example, the device processor 304 can retrieve the kernel information from memory region(s) of a physical memory based on metadata received by the kernel monitoring device 300.

The tasks of the device processor 304 include a kernel information measurement task 310 to measure the received kernel information to determine an integrity of the kernel of the VM. Measuring the received kernel information can refer to computing a value (e.g., a cryptographic hash value) based on the received kernel information.

In some examples, the metadata includes a memory map of the VM, where the memory map refers to a storage location (or multiple storage locations) of a memory containing the kernel information associated with the kernel of the VM to be monitored.

In some examples, the metadata may be received by the kernel monitoring device 300 from an administrator or another user. In further examples, the device processor 304 receives the metadata from an agent (e.g., the OS system agent 130A or 130B in FIG. 1) in the VM over a communication channel between the kernel monitoring device 300 and the VM. The device processor 304 uses the metadata to retrieve and measure the kernel information associated with the kernel.

In some examples, the VM is a first VM, and the processing resource of the computing system is to execute a plurality of VMs including the first VM. Prior to the triggering of the hot add, the device processor 304 determines whether a second VM of the plurality of VMs is connected to the kernel monitoring device 300. Based on determining that the second VM is connected to the kernel monitoring device 300, the device processor 304 triggers a hot remove of the kernel monitoring device 300 from the second VM.

In some examples, the device processor 304 selects, using a selection criterion (e.g., a round robin scheduling criterion, a priority scheduling criterion, a random criterion, a priority-based round robin scheduling criterion, or any other selection criterion, the first VM from among the plurality of VMs to monitor. The device processor 304 determines whether the first VM is currently actively running. The triggering of the hot add of the kernel monitoring device 300 with respect to the first VM is based on a determination that the first VM is currently actively running.

In some examples, the hot add of the kernel monitoring device by a hypervisor establishes a pass-through connection of the kernel monitoring device 300 to the VM. The pass-through connection enables a direct connection of the kernel monitoring device and the VM without passing through the hypervisor.

In some examples, the device processor 304 determines whether the measuring of the VM by the kernel monitoring device 300 is a first measurement of the VM. Based on a determination that the measuring of the VM by the kernel monitoring device 300 is the first measurement of the VM, the kernel monitoring device 300 stores measurement information produced by the measuring as a reference measurement in the kernel monitoring device 300.

In some examples, the device processor 304 checks a running state information of the VM. The running state information includes a state of the VM and time information indicating a time length of execution of the VM. An example of the running state information includes the lifecycle state information discussed further above. The determination that the measuring of the VM by the kernel monitoring device is the first measurement of the VM is based on the running state information including the time information.

In some examples, the device processor 304 determines that the kernel of the VM has been tampered with responsive to detecting based on the time information that the time length of execution of the VM has been reduced.

In some examples, the determination that the measuring of the VM by the kernel monitoring device is the first measurement of the VM is responsive to the running state information indicating that the VM is running and started up normally.

In some examples, after the measuring of the received kernel information, the device processor 304 triggers a hot remove of the kernel monitoring device from the VM.

In some examples, the device processor 304 implements I/O virtualization and includes a kernel integrity determination VF that is a virtualized instance of the kernel monitoring device 300. The hot add includes hot adding the kernel integrity determination VF with respect to the VM, and the measuring of the received kernel information to determine the integrity of the kernel of the VM is performed by the kernel integrity determination VF.

In some examples, the kernel monitoring device 300 includes a plurality of kernel integrity determination VFs that are virtualized instances of the kernel monitoring device 300. A quantity of the kernel integrity determination VFs is less than a quantity of VMs that are to be monitored. The hot add includes hot adding a first kernel integrity determination VF with respect to the VM, and the measuring of the received kernel information to determine the integrity of the kernel of the VM is performed by the first kernel integrity determination VF.

In some examples, after the measuring of the received kernel information, the first kernel integrity determination VF triggers a hot remove of the kernel monitoring device 300 from the first VM. The first kernel integrity determination VF triggers a hot add of the first kernel integrity determination VF with respect to a second VM to determine an integrity of a kernel of the second VM.

In some examples, a second kernel integrity determination VF triggers a hot add of the second kernel integrity determination VF with respect to a further VM. After the hot add of the second VF with respect to the further VM, the second kernel integrity determination VF receives, from an agent in the second VM, kernel information associated with a kernel of the further VM, and measures the received kernel information associated with the kernel of the further VM to determine an integrity of the kernel of the further VM.

In some examples, the device processor 304 performs I/O virtualization to provide the plurality of kernel integrity determination VFs. In other examples, the device processor 304 does not implement I/O virtualization.

Figure 4:
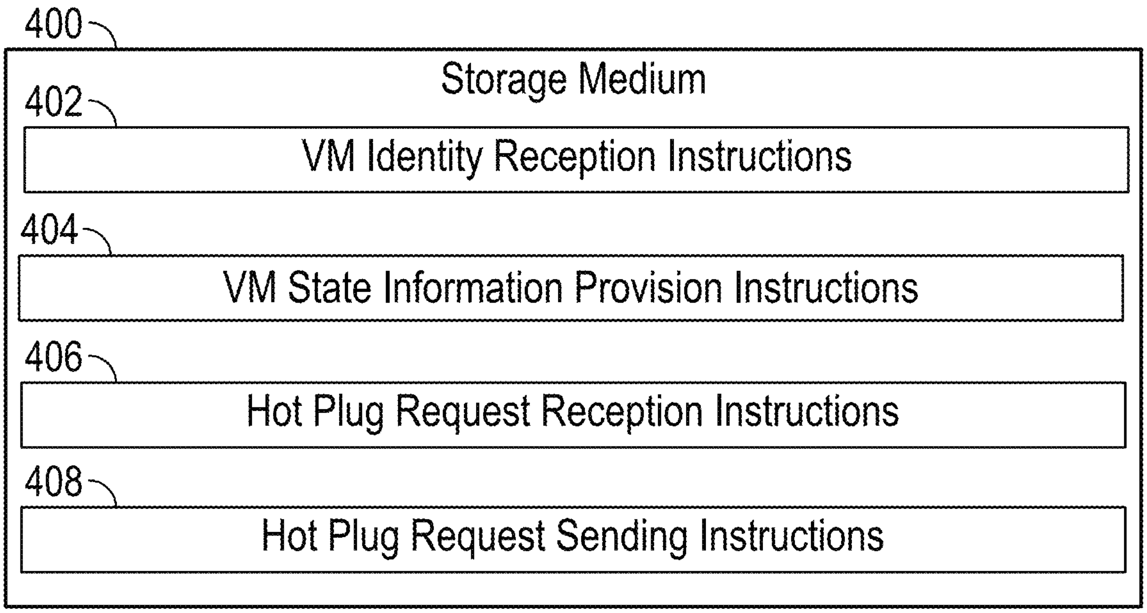
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks. The system may include the computing system 100 of FIG. 1.

The machine-readable instructions include VM identity reception instructions 402 to receive, at an interface of a VM manager, identities of a plurality of VMs that are to be monitored for kernel integrity by a kernel monitoring device. The interface can include a registration UI, for example. The identities can include names of the VMs or globally unique identifiers of the VMs.

The machine-readable instructions include VM state information provision instructions 404 to provide, from the virtual machine manager to the kernel monitoring device, information regarding whether a VM of the plurality of VMs is running. The state information can include the lifecycle state information discussed further above.

The machine-readable instructions include hot plug request reception instructions 406 to receive, at the virtual machine manager, a hot plug request for hot plugging the kernel monitoring device relative to the VM. The hot plugging of the kernel monitoring device relative to the VM performed in association with monitoring of a kernel of the VM by the kernel monitoring device. For example, hot plug request requests a hot add of the kernel monitoring device with respect to the VM to enable measurement of information of the VM by the kernel monitoring device.

The machine-readable instructions include hot plug request sending instructions 408 to send, from the virtual machine manager, the hot plug request to a hypervisor to trigger the hot plugging of the kernel monitoring device relative to the VM.

Figure 5:
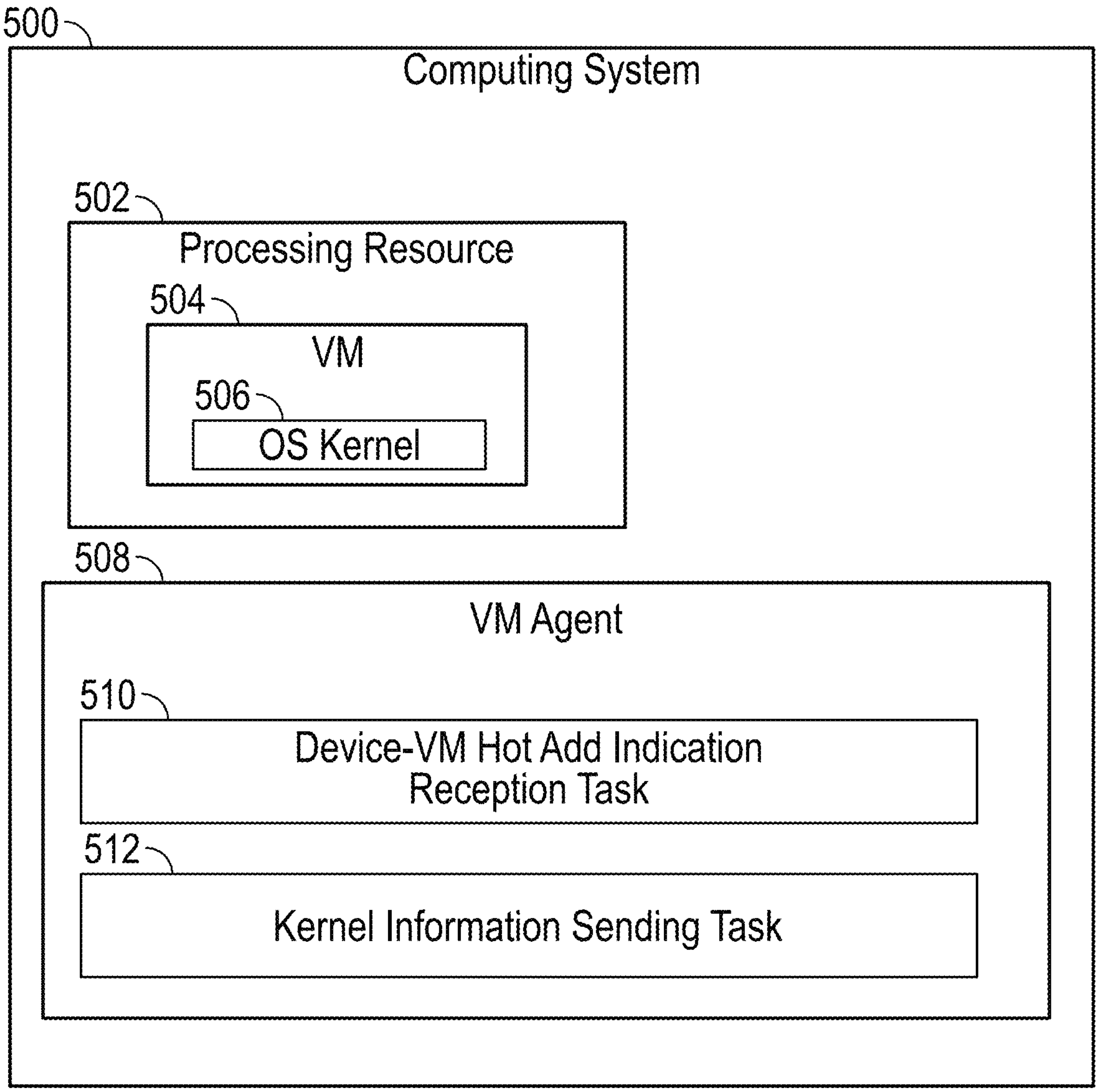
FIG. 5 is a flow diagram of a computing system according to some examples.

FIG. 5 is a block diagram of a computing system 500 according to some examples. An example of the computing system 500 is the computing system 100 of FIG. 1. The computing system 500 includes a processing resource 502 to execute a VM 504 that includes an OS kernel 506. The processing resource 502 may be a host CPU of the computing system 500.

The computing system 500 includes a VM agent 508 to perform various tasks. The VM agent 508 can include machine-readable instructions executable to perform various tasks. The VM agent 508 may be part of the VM 504, and may be executable by the processing resource 502. In some examples, the VM agent 508 is an OS system agent (e.g., 130A or 130B in FIG. 1).

The tasks of the VM agent 508 include a device-VM hot add indication reception task 510 to receive an indication of a hot add of a kernel monitoring device with respect to the VM 504. For example, a hot plug agent (e.g., 128A or 128B in FIG. 1) can provide the hot add indication to the VM agent 508. As another example, the OS kernel 506 can provide the hot add indication to the VM agent 508. As yet a further example, the VM agent 508 is loaded by the OS kernel 506 when the kernel monitoring device is hot added. The starting of the VM agent 508 by the OS kernel 506 may constitute an indication of the hot add of the kernel monitoring device with respect to the VM 504.

The tasks of the VM agent 508 include a kernel information sending task 512 to, based on the indication, send kernel information of the OS kernel 506 to the kernel monitoring device for monitoring of an integrity of the OS kernel 506. The kernel monitoring device can measure the kernel information to determine the integrity of the OS kernel 506.

A "BMC" (which can be used to implement the kernel monitoring device 102 of FIG. 1) can refer to a specialized service controller that monitors the physical state of a computing system using sensors and communicates with a remote management system (that is remote from the computing system) through an independent "out-of-band" connection. The BMC can perform management tasks to manage components of the computing system. Examples of management tasks that can be performed by the BMC can include any or some combination of the following: power control to perform power management of the computing system (such as to transition the computing system between different power consumption states in response to detected events), thermal monitoring and control of the computing system (such as to monitor temperatures of the computing system and to control thermal management states of the computing system), fan control of fans in the computing system, system health monitoring based on monitoring measurement data from various sensors of the computing system, remote access of the computing system (to access the computing system over a network, for example), remote reboot of the computing system (to trigger the computing system to reboot using a remote command), system setup and deployment of the computing system, system security to implement security procedures in the computing system, and so forth.

In some examples, the BMC can provide so-called "lights-out" functionality for a computing system. The lights out functionality may allow a user, such as a systems administrator, to perform management operations on the computing system even if an OS is not installed or not functional on the computing system.

Moreover, in some examples, the BMC can run on auxiliary power provided by an auxiliary power supply (e.g., a battery); as a result, the computing system does not have to be powered on to allow the BMC to perform the BMC's operations. The auxiliary power supply is separate from a main power supply that supplies powers to other components (e.g., a main processor, a memory, an input/output (I/O) device, etc.) of the computing system.

A storage medium (e.g., 400 in FIG. 4) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A kernel monitoring device comprising:

a communication interface to communicate with a processing resource that executes a plurality of virtual machines (VMs) comprising a first VM and a second VM;

a virtual function (VF) that is a virtualized instance of the kernel monitoring device; and a device processor to:

detect that kernel monitoring of the first VM is to be performed;

in response to the detecting, check whether a connection exists between the kernel monitoring device and another VM;

based on detecting that a connection exists between the kernel monitoring device and the second VM, send a hot remove request from the kernel monitoring device to hot remove the VF from the second VM;

based on receiving, at the kernel monitoring device, a confirmation that the VF has been hot removed from the second VM, trigger a hot add of the VF with respect to the first VM to enable communications between the kernel monitoring device and the first VM;

after the hot add of the VF with respect to the first VM, receive, from the first VM, information associated with a kernel of the first VM; and measure, using the VF, the received information to determine an integrity of the kernel of the first VM.

2. The kernel monitoring device of claim 1, wherein the device processor is to obtain metadata relating to the information associated with the kernel of the first VM, the metadata comprising a memory map of the first VM, the memory map referring to a storage location of a memory containing the information associated with the kernel of the first VM to be monitored.

3. The kernel monitoring device of claim 2, wherein the device processor is to:

receive the metadata from an agent in the first VM over a communication channel between the kernel monitoring device and the first VM; and use the metadata to monitor the information associated with the kernel.

4. The kernel monitoring device of claim 1, wherein the hot remove request is sent from the kernel monitoring device to a VM manager or a hypervisor.

5. The kernel monitoring device of claim 1, wherein the device processor is to:

detect that kernel monitoring of the first VM is to be performed based on selecting, using a selection criterion, the first VM from among the plurality of VMs to monitor; and determine whether the first VM is currently running, wherein the checking of whether the connection exists between the kernel monitoring device and another VM is based on a determination that the first VM is currently running.

6. The kernel monitoring device of claim 1, wherein the hot add of the VF with respect to the first VM by a hypervisor establishes a pass-through connection of the kernel monitoring device to the first VM, and wherein the pass-through connection enables a direct connection of the kernel monitoring device and the first VM without passing through the hypervisor.

7. The kernel monitoring device of claim 1, wherein the device processor is to:

determine whether the measuring of the received information by the kernel monitoring device is a first measurement of the first VM; and based on a determination that the measuring of the received information by the kernel monitoring device is the first measurement of the first VM, store measurement information produced by the measuring as a reference measurement in the kernel monitoring device.

8. The kernel monitoring device of claim 7, wherein the device processor is to:

check running state information of the first VM, the running state information including time information indicating a time length of execution of the first VM, wherein the determination that the measuring of the first VM by the kernel monitoring device is the first measurement of the first VM is based on the running state information including the time information.

9. The kernel monitoring device of claim 8, wherein the device processor is to:

determine that the kernel of the first VM has been tampered with responsive to detecting based on the time information that the time length of execution of the first VM has been reduced.

10. The kernel monitoring device of claim 1, wherein the device processor is to:

after the measuring of the received information, send a hot remove request from the kernel monitoring device to a VM manager or a hypervisor to hot remove the VF from the first VM.

11. The kernel monitoring device of claim 1, comprising a plurality of virtual functions (VFs) that are virtualized instances of the kernel monitoring device, wherein the VF is a member of the plurality of VFs.

12. The kernel monitoring device of claim 11, wherein a second VF of the plurality of VFs is to:

trigger a hot add of the second VF with respect to a third VM of the plurality of VMs;

after the hot add of the second VF with respect to the third VM, receive, from an agent in the third VM, information associated with a kernel of the third VM; and measure the received information associated with the kernel of the third VM to determine an integrity of the kernel of the third VM.

13. The kernel monitoring device of claim 1, wherein the device processor is to receive, from the first VM, a reference measurement of kernel information of the kernel of the first VM, wherein the measuring of the received information comprises generating a measurement of the kernel information of the kernel of the first VM, and wherein the determining of the integrity of the kernel of the first VM is based on a comparison of the generated measurement and the reference measurement.

14. The kernel monitoring device of claim 11, wherein the device processor is to perform input/output (I/O) virtualization to provide the plurality of VFs, the I/O virtualization comprising Single Root I/O Virtualization (SR-IOV) or Scalable I/O Virtualization (SIOV).

15. The kernel monitoring device of claim 13, wherein the kernel information comprises program code of the kernel.

16. A non-transitory machine-readable storage medium comprising instructions that upon execution cause a kernel monitoring device to:

detect that kernel monitoring of a first virtual machine (VM) of a plurality of VMs is to be performed by the kernel monitoring device, the kernel monitoring device comprising a virtual function (VF) that is a virtualized instance of the kernel monitoring device;

in response to the detecting, check whether a connection exists between the kernel monitoring device and another VM of the plurality of VMs;

based on detecting that a connection exists between the kernel monitoring device and a second VM of the plurality of VMs, send a hot remove request from the kernel monitoring device to hot remove the VF from the second VM;

based on receiving, at the kernel monitoring device, a confirmation that the VF has been hot removed from the second VM, trigger a hot add of the VF with respect to the first VM to enable communications between the kernel monitoring device and the first VM;

after the hot add of the VF with respect to the first VM, receive, from the first VM, information associated with a kernel of the first VM; and measure, using the VE, the received information to determine an integrity of the kernel of the first VM.

17. The non-transitory machine-readable storage medium of claim 16, wherein the instructions upon execution cause the kernel monitoring device to:

receive, from the first VM, a reference measurement of kernel information of the kernel of the first VM, wherein the measuring of the received information comprises generating a measurement of the kernel information of the kernel of the first VM, and wherein the determining of the integrity of the kernel of the first VM is based on a comparison of the generated measurement and the reference measurement.

18. A computing system comprising:

a processing resource to execute a first virtual machine (VM) comprising an operating system (OS) kernel;

a kernel monitoring device comprising:

a virtual function (VF) that is a virtualized instance of the kernel monitoring device; and a device processor to:

detect that kernel monitoring of the first VM is to be performed;

in response to the detecting, check whether a connection exists between the kernel monitoring device and another VM;

based on detecting that a connection exists between the kernel monitoring device and a second VM, send a hot remove request from the kernel monitoring device to hot remove the VF from the second VM;

based on receiving, at the kernel monitoring device, a confirmation that the VF has been hot removed from the second VM, trigger a hot add of the VF with respect to the first VM to enable communications between the kernel monitoring device and the first VM;

after the hot add of the VF with respect to the first VM, receive, from the first VM, information associated with a kernel of the first VM; and measure, using the VF, the received information to determine an integrity of the kernel of the first VM.

19. The computing system of claim 18, wherein the device processor is to perform input/output (I/O) virtualization to provide the VF, the I/O virtualization comprising Single Root I/O Virtualization (SR-IOV) or Scalable I/O Virtualization (SIOV).

* * * * *